United States Patent [19]
Greiner

[11] 3,774,115
[45] Nov. 20, 1973

[54] SIGNAL GENERATOR FOR UNBALANCE DETECTORS

[75] Inventor: Richard A. Greiner, Madison, Wis.

[73] Assignee: Giddings & Lewis, Inc., Fond du Lac, Wis.

[22] Filed: Jan. 24, 1972

[21] Appl. No.: 220,528

Related U.S. Application Data

[62] Division of Ser. No. 088,048, Nov. 9, 1970, abandoned.

[52] U.S. Cl. .................. 328/36, 307/228, 307/261, 328/127, 328/181
[51] Int. Cl. ........................... H03k 5/08, H03k 4/08
[58] Field of Search ................... 307/228, 229, 261; 328/27, 36, 127, 181

[56] References Cited
UNITED STATES PATENTS

| | | | |
|---|---|---|---|
| 3,350,651 | 10/1967 | Davis | 328/127 X |
| 3,256,426 | 6/1966 | Roth et al. | 328/127 X |
| 3,349,257 | 10/1967 | Thomas et al. | 328/27 X |
| 3,484,593 | 12/1969 | Schmoock et al. | 328/127 X |
| 3,617,769 | 11/1971 | Hanson | 307/261 X |
| 2,748,272 | 5/1956 | Schrock | 328/127 X |
| 3,274,501 | 9/1966 | Heinsen | 307/228 X |
| 3,322,973 | 5/1967 | Baldwin | 307/228 X |
| 3,440,448 | 4/1969 | Dudley | 328/127 X |
| 3,278,765 | 10/1966 | Mudie | 307/106 |

*Primary Examiner*—Stanley D. Miller, Jr.
*Attorney*—Wolfe, Hubbard, Leydig, Voit & Osann, Ltd.

[57] ABSTRACT

An improved system for measuring and signaling the magnitude and angular location of unbalance in a rotatable workpiece, characterized especially by a noncontacting sine-cosine wave generator which imposes no mechanical inertia or self-contained unbalance on the system while the workpiece is rotationally driven for testing, and which is immune from the adverse effects of variations in the speed of the rotational drive.

8 Claims, 12 Drawing Figures

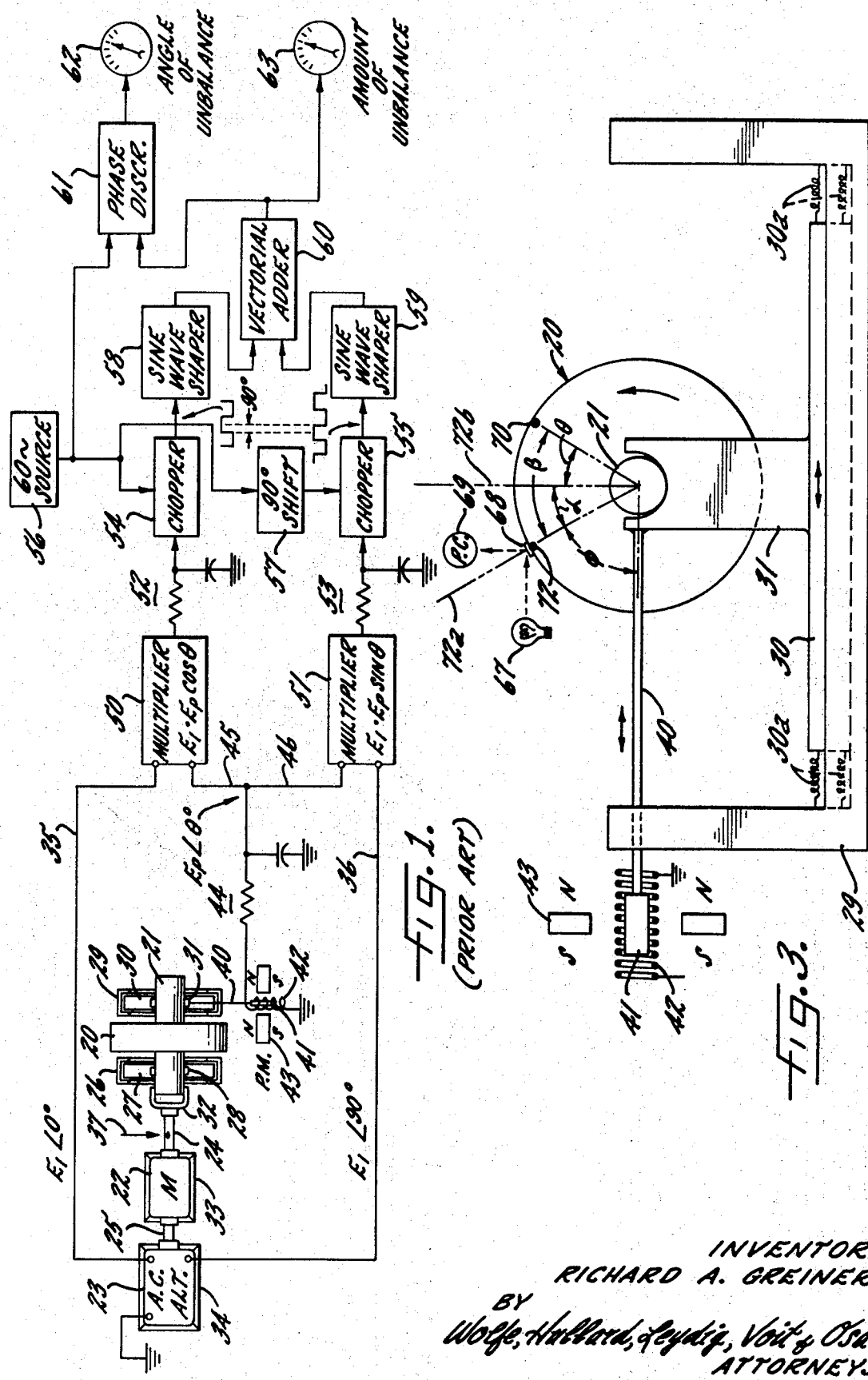

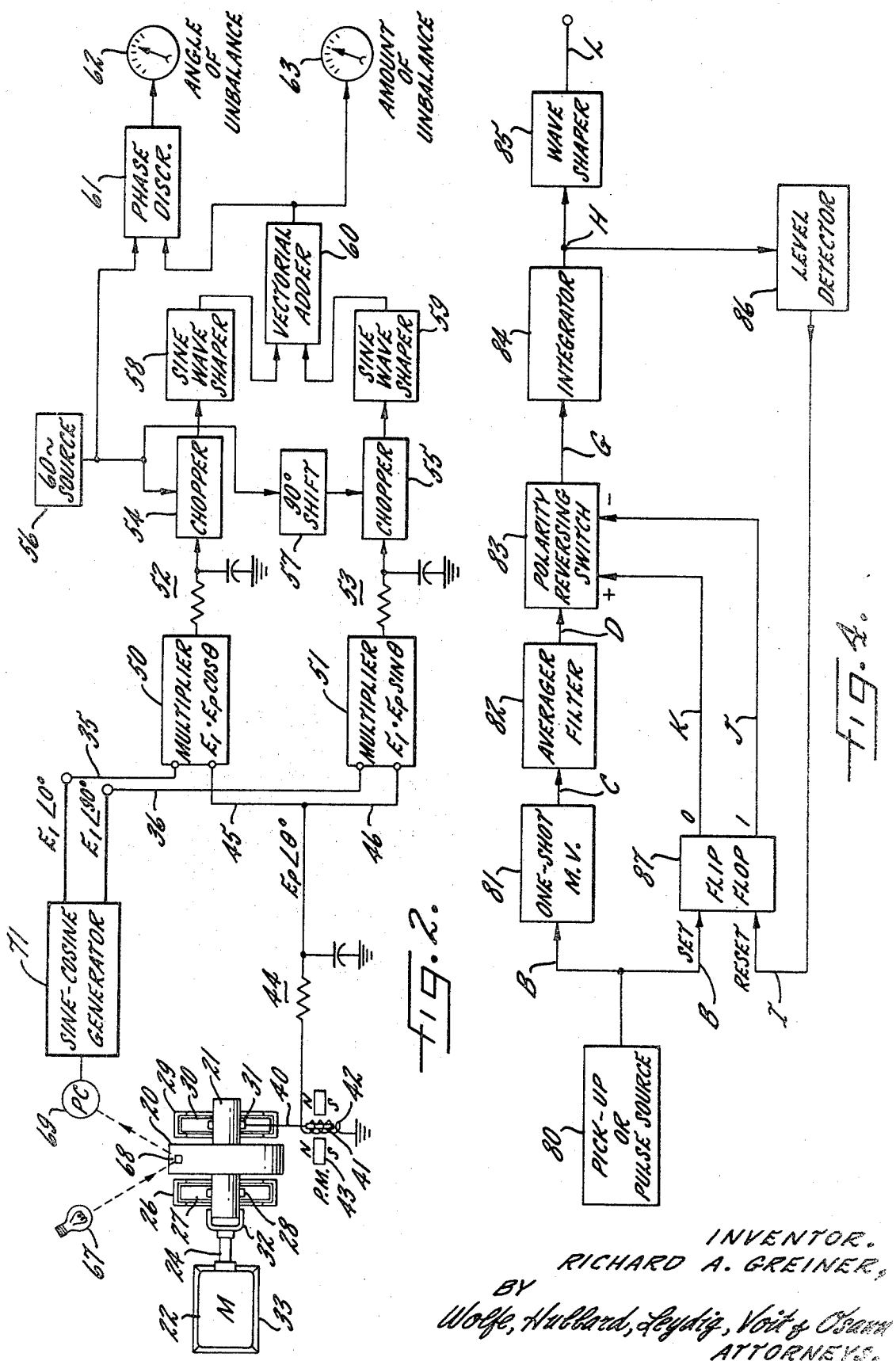

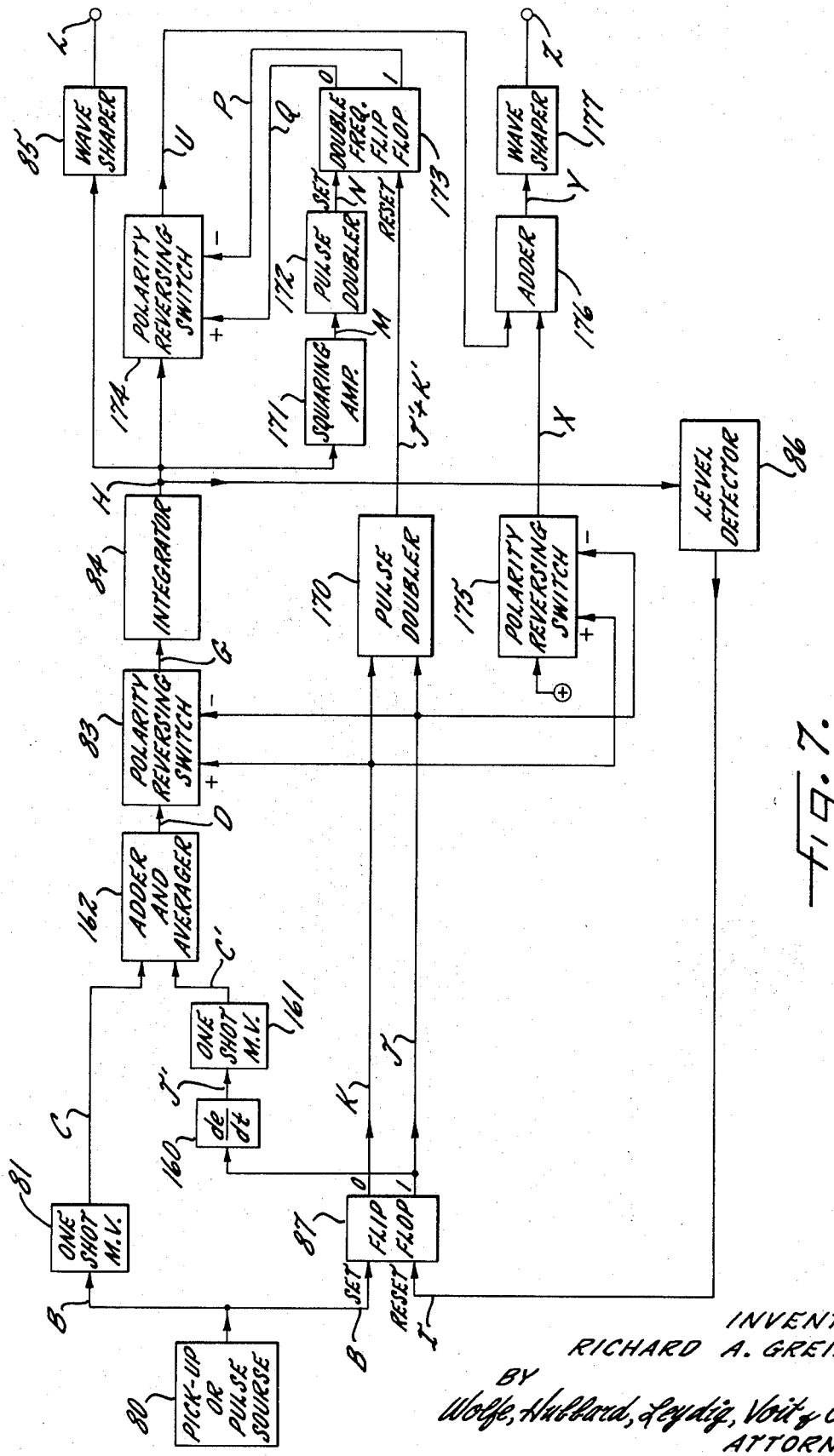

SIGNAL GENERATOR FOR UNBALANCE DETECTORS

This is a division of application Ser. No. 88,048, now abandoned filed Nov. 9, 1970.

The present invention pertains in general to systems for measuring and signaling the unbalance of rotatable workpieces, and to electrical signal generators, and in particular to signal generators which produce a first constant amplitude signal that is in synchronism with some cyclically reoccurring event and a second constant peak-amplitude signal that is 90° out of phase from the first signal. While not so limited in its application, the invention relates primarily to the generation of two sinusoidal waves in phase quadrature, that is, a sine wave and a cosine wave employed in unbalance measuring machines which determine the magnitude of unbalance and its location within a rotatable workpiece, wherein a signal representative of the vibrations caused by the unbalance in the rotating workpiece is multiplied with each sinusoidal wave to obtain final signals indicative of the magnitude and the angular position of the unbalance.

It is the primary aim of the invention to provide an improved non-contacting sine-cosine generator which produces a constant amplitude sine wave and an equal constant amplitude cosine wave, these being synchronized in one advantageous application with the rotating workpiece of an unbalance detecting system and having amplitudes independent of the rotational velocity of the workpiece.

In another sense, it is an objective to provide an improved electrical signal generator of the type generally designated above, and characterized particularly by the accuracy of the 90° phase relation between the two output signals and their constant peak amplitudes despite changes in frequency of the recurring event to which they are matched.

A further important object of this invention is to provide such a signal generator wherein one of the two output signals is in phase with recurring input pulses which are indicative of occurrences of a cyclically reoccurring event, and the second signal is precisely 90° out of phase from the input pulse signal. Another object is to provide such a signal generator wherein the constant amplitudes of the two output signals are equal and are independent of the frequency of the input pulse signal.

A related object is to provide an improved and novel non-contacting, constant amplitude sine-cosine signal generator which avoids harmonic and ripple voltages in the sine and cosine output signals without appreciable lags due to large time constants. It is a further related object to provide an improved and novel tachometer circuit to generate a D.C. voltage that is a measure of the frequency of an input signal wherein the adverse effect voltage ripple is substantially eliminated in generating the sine and cosine signals.

It is a yet further object to produce a first triangular wave for use in generating the sine and cosine signals which remain in phase with the input pulse signal and which is self-locked at a constant amplitude for all frequencies. An important related object is to produce a second constant amplitude triangular wave 90° out of phase from the first triangular wave without the time lags inherent in integration.

Other objects and advantages will become apparent as the following description proceeds, taken in conjunction with the accompanying drawings, in which:

FIG. 1 is a block diagram of a typical prior art system for signaling the amount and angular location of unbalance in a rotatable workpiece;

FIG. 2 is a block diagram of an unbalance measuring system embodying the features of the present invention;

FIG. 3 is a diagrammatic elevational view of a workpiece mounted on a support structure for a measurement operation according to the invention;

FIG. 4 shows a more detailed block diagram of the sine-cosine generator represented by a single block in FIG. 2;

FIG. 7 is a block diagram of a modified version of a sine-cosine generator embodying the features of the present invention and which can be incorporated into the unbalance detector of FIG. 2;

Figure 8B:
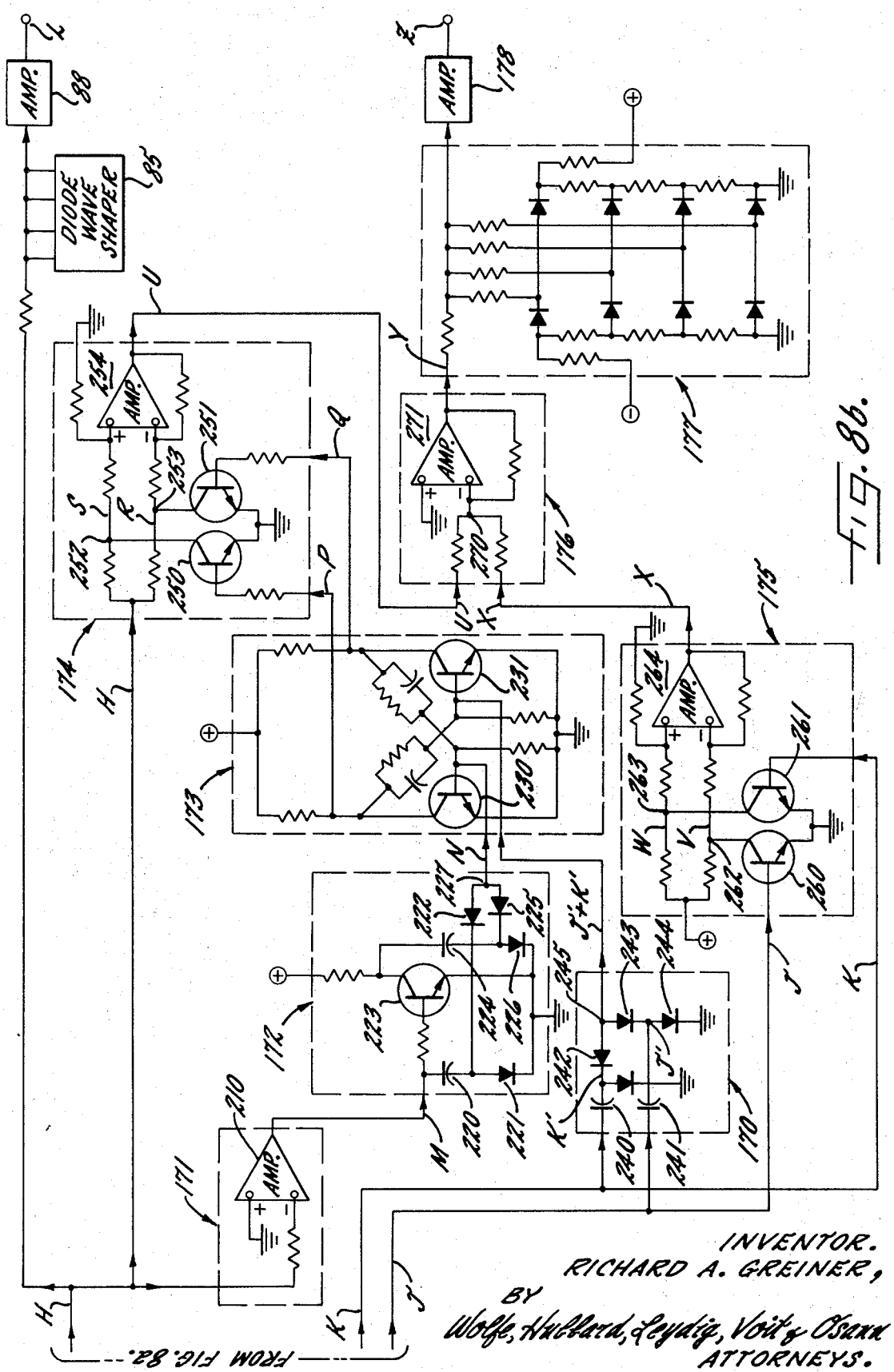
Figure 9A:
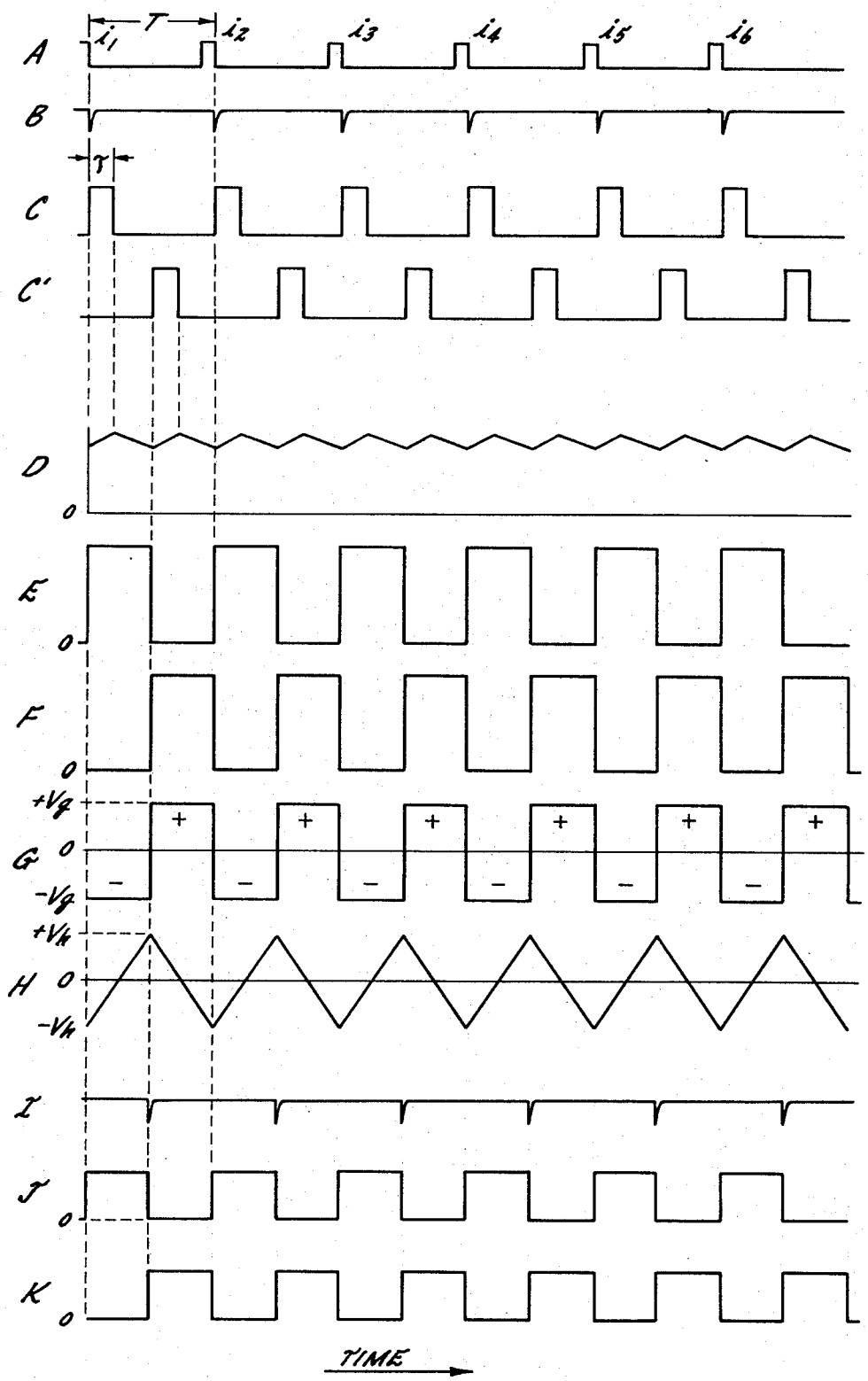
Figure 9B:
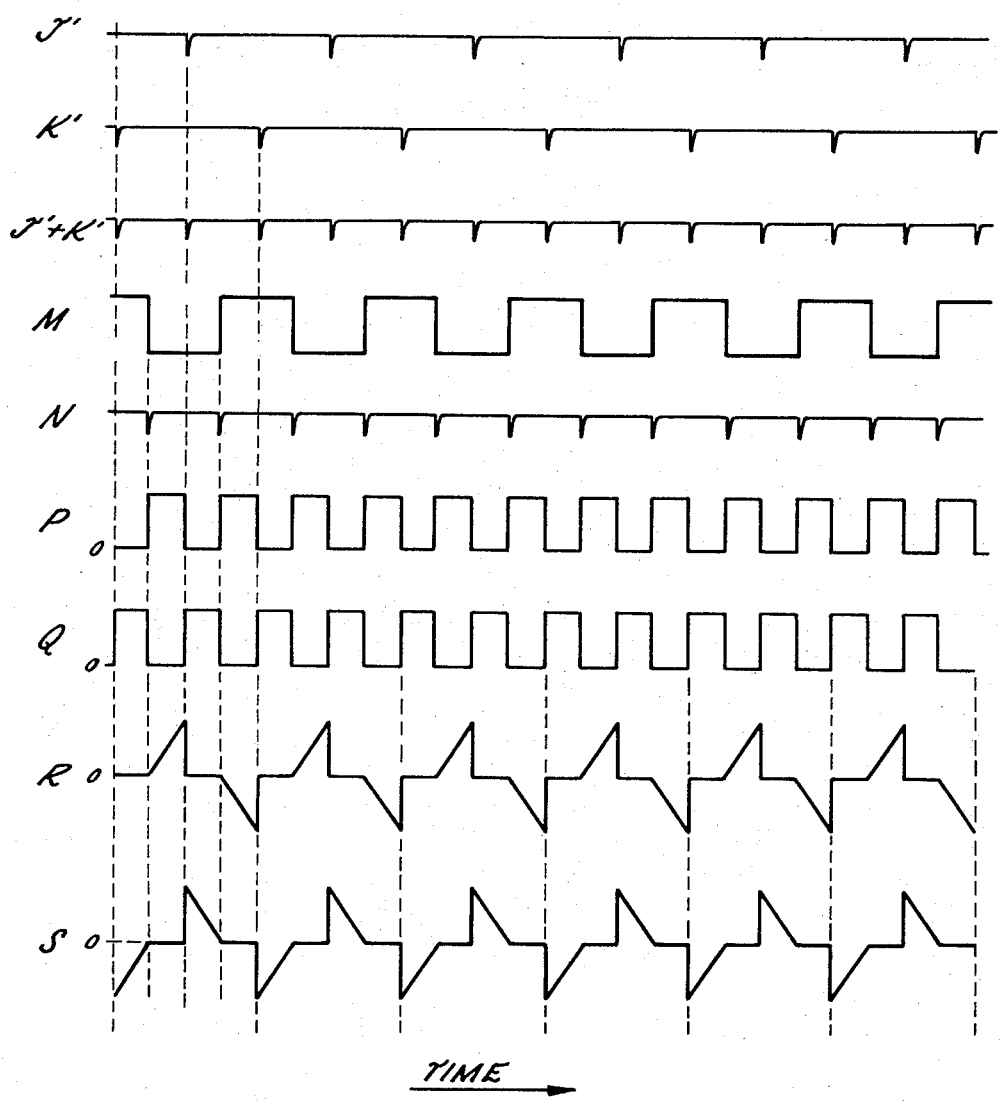
Figure 9C:
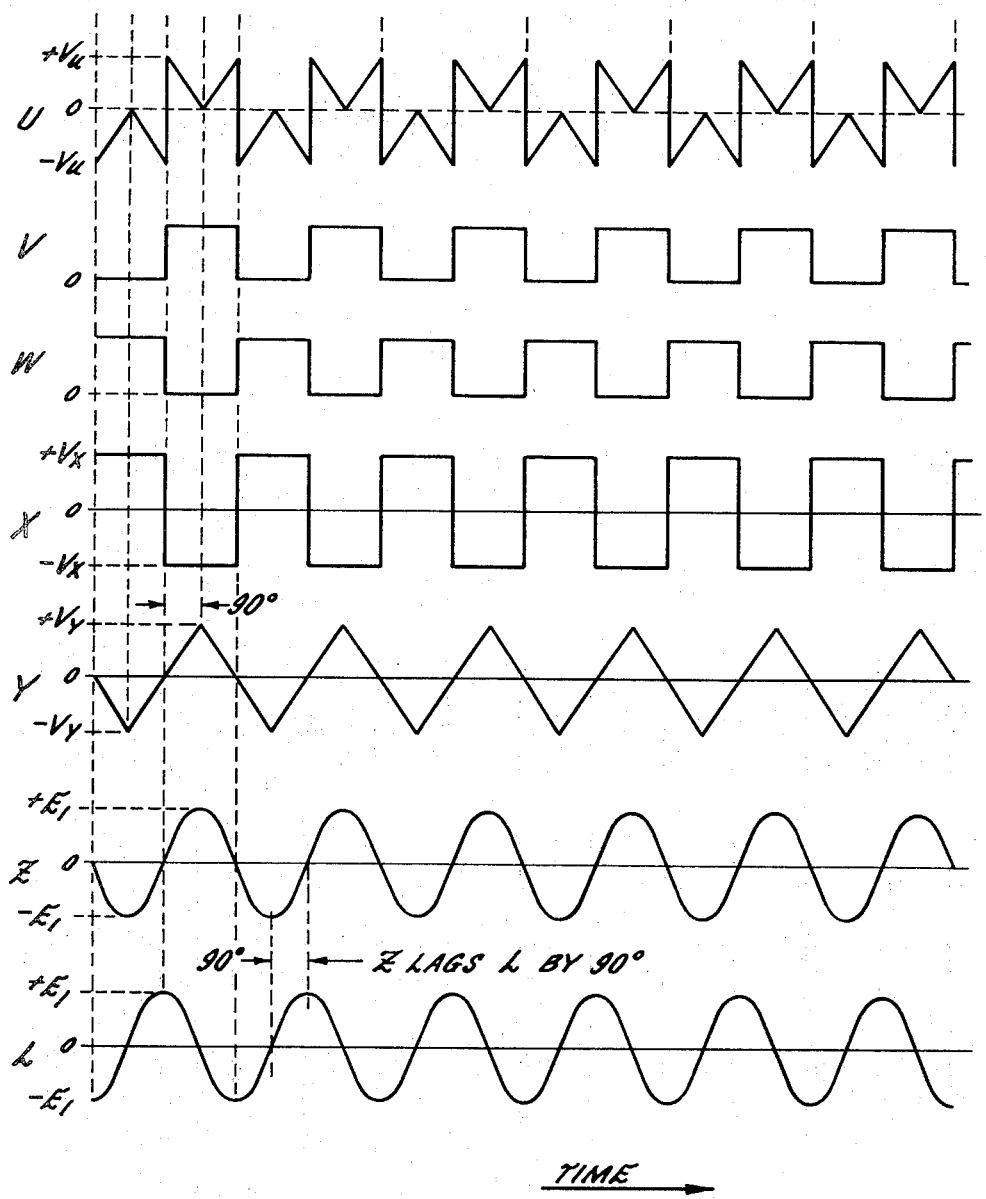

FIGS. 8a and 8b, when joined along the indicated junction lines, constitute a detailed block diagram and schematic circuit diagram of the sine-cosine generator shown in FIG. 7; and FIGS. 9a, 9b and 9c are waveform diagrams illustrating the various voltages existing within the embodiment of the sine-cosine generator shown in FIGS. 8a and 8b.

While the invention has been shown and will be described in substantial detail with reference to particular, exemplary embodiments thereof, there is no intention that it be thus limited to such detail. On the contrary, it is intended here to cover all modifications, alternatives and equivalents falling within the spirit and scope of the invention as defined by the appended claims.

Turning now to the prior art unbalance detecting system illustrated in FIG. 1, there is shown a workpiece 20 having stub shafts 21. A motor 22, mounted on base 33, operates as a power source through drive shaft 24 and coupling 32 to rotate the stub shafts 21 and the workpiece 20 at a substantially constant angular velocity. Motor 22 also drives a two phase alternator 23, shown mounted on base 34, through a second drive shaft 25 at the same angular velocity as the workpiece 20.

The stub shafts are journaled and supported by two half bearings 28 and 31 respectively mounted on sliding bearing blocks 27 and 30 such that any lateral motion caused by the vibrations of the workpiece is imparted to the sliding bearing blocks. As shown in FIG. 3, two bearing blocks 27 and 30 rest on bases 26 and 29, respectively, with freedom to slide or vibrate horizontally against the light bias of centering springs 30a.

If the workpiece is perfectly balanced, the workpiece will smoothly rotate about its center axis; but if the workpiece is unbalanced, it will vibrate at a frequency equal to the frequency of rotation. The magnitude of these vibrations is an accurate measure of the amount of unbalance.

The vibrations of the workpiece are transmitted to the half bearings 28 and 31, causing the constrained bearing blocks 27 and 30 and bases 26 and 29 to vibrate in a horizontal direction. As illustrated in FIG. 3, the sliding bearing block 30 lies in an elongated channel in the base 29 such that it can only move horizontally between the upstanding ends of the base.

The horizontal vibrations of the workpiece and the half-bearings are also transmitted by a rod 40 to the armature 41 of an electromagnetic pick-up having a stationary winding 42 associated with a permanent magnet 43. Axial vibration of the armature produce changes in the magnetic flux linking the winding 42, and in well known fashion cause an approximately sinusoidal pick-up voltage to be induced in the winding. The pick-up voltage is proportional in amplitude to the magnitude of sensed vibration, and equal in frequency to the frequency of vibration, the latter being equal to the rotational speed of the workpiece. Because the rod 40 is disposed in a predetermined plane extending radially from the axis of workpiece rotation (and as here shown, a horizontal plane) the pick-up voltage will reach a positive or negative peak in its waveform at the instants that the "heavy point" of unbalance on the workpiece passes through that plane. The "phase" of the pick-up voltage is thus indicative of the angular location on the workpiece of the point of unbalance. Thus, the armature 41, coil 42 and permanent magnet 43 operate as a transducer which detects the vibrations of the workpiece and converts them into a sinusoidal electrical signal, the amplitude of which is indicative of the magnitude of the vibrations and thus of the unbalance in the workpiece and the phase of which is indicative of the angular position of the unbalance relative to a reference point on the workpiece.

In prior art unbalance detecting apparatus of the type shown in FIG. 1, the motor 22 also drives the alternator 23, which generates two sinusoidal voltages in phase quadrature. These voltages in theory are supposed to have equal and constant amplitudes, and of course they have frequencies equal to the frequency of rate of rotation of the workpiece 20 and thus to the frequency of the pick-up voltage induced in the coil 42. Because the alternator rotor is driven by the motor 22 and thus rigidly coupled to the workpiece 20 one of the alternator voltages (here labeled $E_1 \:/0°$) is in phase with the instants at which a reference point on the workpiece passes through a particular fixed angular location in space. Reference point 37 (FIG. 1) on drive shaft 24 corresponds to a reference point on the workpiece and all angular measurements are read relative to this point in a well-known manner.

The signal indicative of the vibrations of the workpiece 20 induced in coil 42 is fed to an R-C filter 44 which eliminates a substantial portion of noise and harmonics in the signal. The output of the R-C filter is a waveform generally but not purely sinusoidal in shape, having an amplitude $E_p$ proportional to the magnitude of unbalance, which by its phase angle $\theta$ is indicative of the angular position of the unbalance, and which has a fundamental frequency equal to the frequency of rotation of the workpiece.

This sinusoidal signal is applied by way of conductors 45 and 46 to multipliers 50 and 51, respectively. Also applied to multipliers 50 and 51 by way of lines 35 and 36, respectively, are the two sinusoidal signals $E_1 \:/0°$ and $E_1 \:/90°$ generated by the A.C. generator 23.

The multipliers 50 and 51 each produce a D.C. output signal proportional to the product of the amplitude of its two input signals and the cosine of the angle between them. For example, the inputs to multiplier 50 are the alternator signal $E_1 \sin wt$, where $w$ is the angular velocity at which the workpiece rotates, and the output signal $E_p \sin(wt + \theta)$ from R-C filter 44, which is indicative of the vibrations of the workpiece caused by the unbalance. Therefore, the D.C. signal generated by the multiplier 50 is a measure of $E_1 \cdot E_p \cos \theta$ because $E_1$ and $E_p$ are the magnitudes of the two input signals and $\theta$ is the phase angle between them. Since the two input signals to multiplier 51 are $E_1 \sin(wt + 90°)$ and $E_p (wt + \theta)$, the D.C. output signal is a measure of $E_1 \cdot E_p \cos(90° - \theta)$, which equals $E_1 \cdot E_p \sin \theta$.

Commonly used as multipliers are well-known devices similar to wattmeters which accept two sinusoidal input voltages $E_a$ and $E_b$ and produce a D.C. output voltage equal to $E_a \cdot E_b \cos \alpha$, where $\alpha$ is the phase angle between the two input voltages.

To obtain a measuremnt of the product of $E_1$ and $E_p$, the output of multiplier 50 is applied to an R-C filter 52 to eliminate any ripple in the output signal. The D.C. signal is then converted into a 60 cycle square wave by a chopper 54 under the control of the 60 cycle source 56. The square wave is next converted into a sinusoidal waveform fixed in phase with the square wave in a conventional filter or shaper 58. The amplitudes of both the square wave and the sinusoidal waveform are proportional to the product $E_1 \cdot E_p \cos \theta$, but their frequencies are fixed arbitrarily at 60 cps. The output of multiplier 51 is also fed to an R-C filter 53, to eliminate ripple and chopped into a 60 cycle square wave in a second chopper 55. But the control signal to chopper 55 from the 60 cycle source 56 is passed through a 90° shifter 57 so that the square wave output of chopper 55 is displaced 90° from the square wave output of chopper 54. The square wave from chopper 55 is then applied to sine wave shaper 59 where it is converted into a sinusoidal waveform which is 90° displaced from the sinusoidal waveform of the sine wave shaper 58 and whose amplitude is proportional to the product $E_1 E_p \sin \theta$.

The results of these conversion operations are two 60 cycle sinusoidal waveforms of different amplitudes, one being proportional to $E_1 E_p \cos\theta$ and the other to $E_1 E_p \sin\theta$, 90° displaced from each other. These two waveforms can be considered to be two resolved components of magnitudes $E_1 E_p \cos\theta$ and $E_1 E_p \sin\theta$, respectively, of a single vector $E_1 E_p$ at the phase angle $\theta$. To obtain the single vector signal, the two sinusoidal waveforms are added together in vectorial adder 60 which generates a 60 cycle sinusoidal waveform whose amplitude is proportional to $E_1 E_p$ and which is displaced by a phase angle $\theta$ from the output of the 60 cycle source 56. The single vector signal is then applied to a meter 63 which gives an output reading indicative of $E_p$ because, as noted above, the term $E_1$ in the product $E_1 E_p$ is in theory constant. Thus, the meter 63 may be calibrated to display the amplitude of the voltage $E_p$ induced in coil 42, or, more directly, the magnitude of the vibrations of the workpiece and thus of the unbalance in the workpiece. The single vector signal is also applied to phase discriminator 61 which compares it with the output from the 60 cycle source 56 to produce an output signal which is a measure of the phase angle between the two signals. This output signal is applied to meter 62 which gives an output reading which is indicative of $\theta$, the angle of unbalance. This angular reading is then marked off from the point on workpiece 20 corresponding to reference point 37 on drive shaft 24 to locate the point of unbalance in the workpiece. Thereafter weight may be removed from the pont of unbalance or added at a diametrically opposite point.

One of the major inadequacies of the prior art unbalance detector systems resides in the structure used to generate the reference sinusoidal signals $E_1 \angle 0°$ and $E_1 \angle 90°$ that are multiplied with the signal indicative of the vibrations of the workpiece. As noted with reference to FIG. 1, the prior art systems use a two phase alternator mechanically coupled to the driving motor and thus to the workpiece. In many cases, however, a mechanically driven two phase alternator is simply impractical or imposes serious disadvantages. In those instances where the workpiece is extremely small or light, mechanical coupling to a drive motor is difficult or impractical, and the workpiece is air-driven without precise speed control. In consequence, an alternator possessing considerable inertia or friction cannot be coupled to the workpiece for synchronous mechanical drive. Even if mechanical drive to a light workpiece is employed, any unbalance in a mechanically driven alternator may be reflected as false vibrations of the workpiece. And finally, unless specially constructed and expensive alternators are employed, the alternator output waves may vary with speed and lead to inaccurate final determinations unless special, expensive constant speed drive controls are used.

In accordance with the invention, and in the system shown by FIGS. 2-5, these difficulties are eliminated by providing a sine-cosine generator which has zero mass and no mechanical connections with the driving motor or the workpiece itself. The sine-cosine generator is synchronized with the rotating workpiece in a novel and improved manner to provide a pair of sinusoidal signals displaced 90° from each other and yet which have perfectly constant amplitude even when the rotational speed of the workpiece varies over a wide range.

Referring again to FIG. 3, there is located on the workpiece 20 a predetermined reference point 72 from which the angular reading of meter 62 is marked off ultimately to locate the point of unbalance. According to the embodiment of the invention here disclosed, there is located at the reference point a light reflecting element such as an adhesive-backed aluminum foil strip 68. Spaced from the workpiece is a light source 67, shown here as a focused lamp. Also spaced from the workpiece is a light-responsive transducer, here shown as a photoelectric cell 69, which is oriented relative to the light source 67 and the workpiece such that it detects light from the light source only when the light reflective element 68 on the workpiece passes a predetermined angular position in space, such position being identified in FIG. 3 by the radial line 72a. The photoelectric cell produces a pulse in a train of recurring reference pulses to activate the sine-cosine generator 71 (FIG. 2) each time the rotating workpiece passes through the position 72a, so that the pulses have the same frequency as that of the workpiece rotation and represent the occurrences of a recurring event, namely, the passage of the reference point 72 by a predetermined angular location in space.

Referring to FIG. 3, the workpiece is shown with the reference point 72 located at the predetermined angular position such that the photoelectric cell 69 will detect light from the light source 67 as reflected off of reflecting surface 68. As will be made clear below, the sine-cosine generator 71 is activated to generate a sine wave in phase with (and a cosine wave displaced 90° from) the passings of the reference point 72 by the predetermined angular position 72a which lies at a physical angle $\phi$ from the horizontal, radial plane in which the rod 40 lies and in which workpiece vibrations are sensed by the pick-up 41–42. But on the other hand, it is not necessary for the sine-cosine generator 71 (FIG. 2) to operate in phase with the transducer pulses. Indeed, the sinusoidal waveforms need only have fixed phase relations with the passings of the reference point by the predetermined angular position 72a. If there is a delay in generating the sinusoidal signals, any fixed phase offset between the pick-up pulses and the sinusoidal signals must be added to the readings displayed on the angle member 62 to obtain the correct position of the point of unbalance. For the purposes of this discussion, it will be assumed that there is no such delay.

In brief summary of the angular relationships, let it be assumed that the point of unbalance 70 is located as shown in FIG. 3. When this point passes through a predetermined stationary radial plane (here the horizontal plane 40 in which the rod 40 lies), the pick-up voltage $E_p$ will have an instantaneous maximum or peak value. This means that the voltage $E_p$ will have a positive-going zero-crossing when the unbalance point 70 passes through a stationary plane 72b located 90° from the plane of the rod 40. On the other hand, it has been assumed that the reference pulses from the photocell 69 occur at instants when the reference point 72 passes through the stationary radial position 72a, and that the signal $E_1 \angle 0°$ from the sine-cosine generator 71 (FIG. 2) will have positive-going zero-crossings at such instants. Therefore, if the balance point 70 and reference point 72 were in identical locations, the signal $E_p$ would lead the signal $E_1 \angle 0°$ by an angle of $90° - \phi = \alpha$. But where the unbalance point 70 lies at any physical angle $\beta$ from the reference point 72 (as shown in FIG. 3), the signal $E_p$ will lead the signal $E_1 \angle 0°$ by a phase angle of $\beta - \alpha$. As noted generally above, the angle meter 62 (FIG. 2) will precisely display the electrical phase angle $\theta$ between the signals $E_p$ and $E_1 \angle 0°$. Thus, $$\theta = \beta - \alpha$$
$$\beta = \theta + \alpha = \theta + 90 - \phi$$

This means simply that once the value of $\theta$ for a given workpiece has been read from the meter 62, the point of unbalance 70 may be physically located by adding the known angle $\alpha$ to obtain the value of $\beta$; and by measuring off the angle $\beta$ clockwise from the reference point 72 on the workpiece. The rationale applies equally well of if is negative, i.e., if the point of unbalance 70 is located counterclockwise from the reference point 72.

With the foregoing in mind, the organization and operation of the sine-cosine generator 71 employed in FIG. 2 for deriving the reference sinusoidal signals $E_1 \angle 0°$ and $E_1 \angle 90°$ will be described with reference to FIGS. 4 through 6. The apparatus of FIGS. 4 and 5 discloses one embodiment of that part of the sine-cosine generator 71 which generates the first constant amplitude sinusoidal signal $E_1 \angle 0°$.

Figure 6:
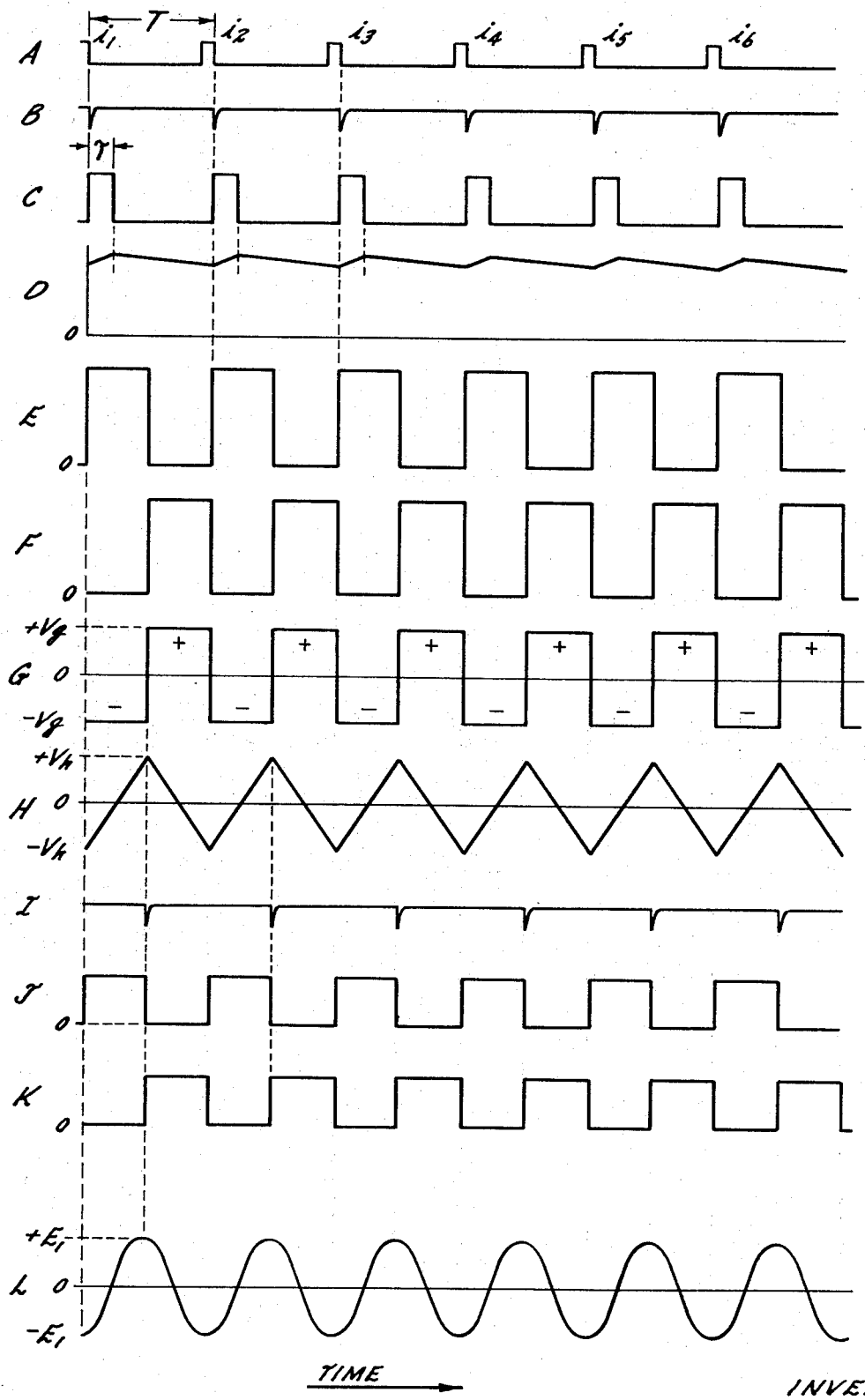
FIG. 6 is a waveform diagram illustrating the various voltages existing within the embodiment of the sine-cosine generator shown in FIG. 5.
Figure 82:
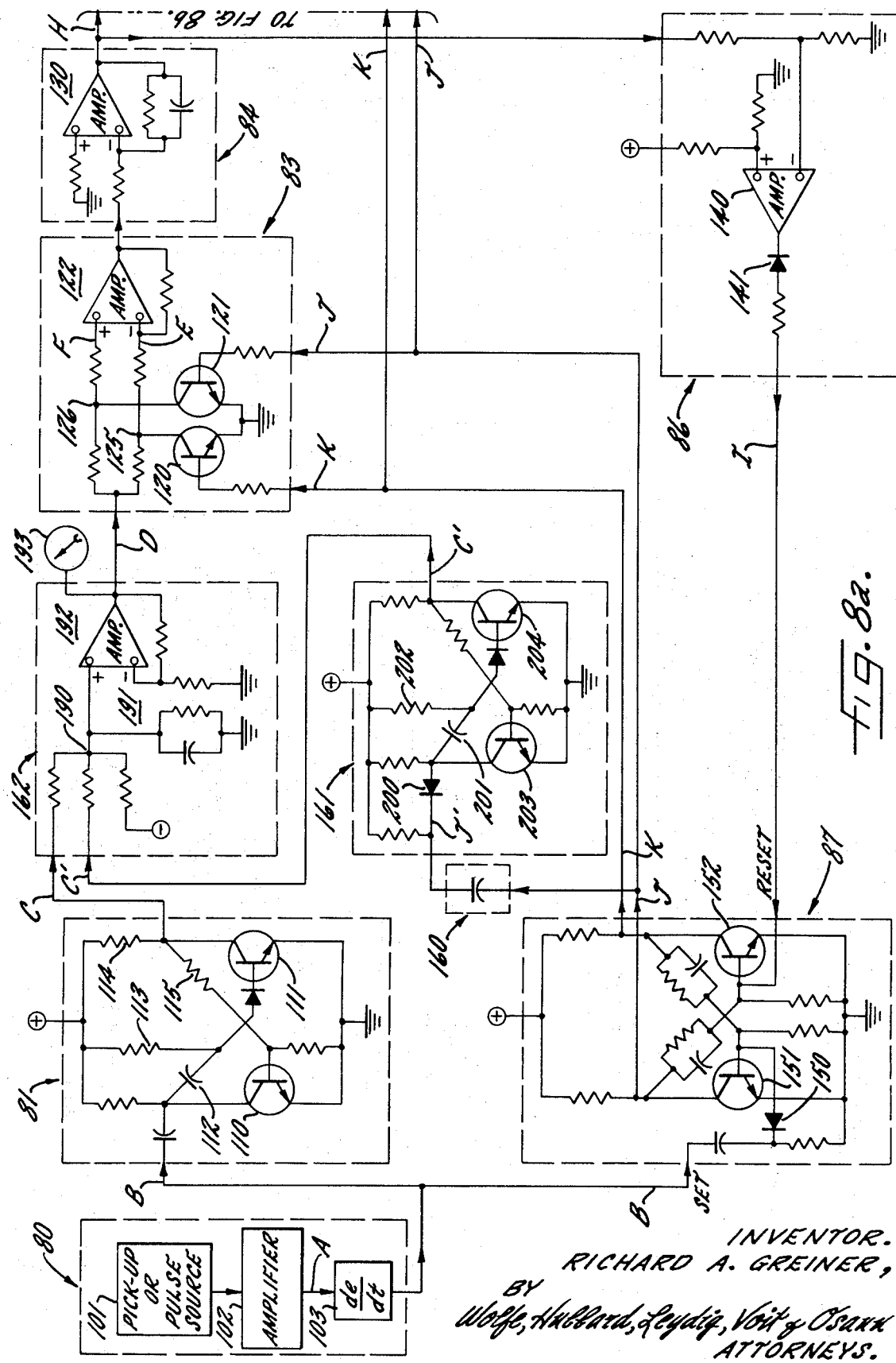

A pulse source 80 in FIG. 4 corresponds to and represents the photocell 69 shown in FIG. 2, and it provides a periodic train of negative pulses, waveform B in FIG. 6, of extremely small pulse width, often referred to as voltage spikes, in fixed phase relation with a cyclically recurring event, i.e., each passage of the reference point 72 through the radial location 72a (FIG. 3). These negative spikes are applied to a one-shot monostable multivibrator 81 which produces a train of pulses C (FIG. 6) in phase with the negative spikes; these pulses have a constant amplitude and a constant pulse width $\tau$ regardless of the frequency of the negative spikes. An averaging filter 82 responds to the pulse train C to produce a D.C. voltage D, the magnitude of which is directly proportional to the frequency of the pulse train.

Polarity reversing switch 83 supplies the D.C. voltage D to the input of an integrator 84 which integrates the D.C. voltage to obtain a ramp waveform. The ramp waveform would continue to increase to the maximum level which the integrator was capable of generating and would then level off at that value if allowed to run freely. However, in accordance with the invention, means are provided to change the effective polarity of the input voltage supplied to the integrator at instants when (a) the integrator output signal rises to a predetermined level and (b) a reference pulse from the source 80 appears. For this purpose, the output of the integrator 84 is supplied to a level detector 86 which supplies a resetting pulse (waveform I, FIG. 6) to a flip-flop 87 at each instant when the integrator output (waveform H) rises to a predetermined level $+V_h$; and the flip-flop is connected to receive on its "set" input the reference pulses B. The flip-flop 87 is a bi-state device which in the set or "one" state produces a control signal J and in the reset or "zero" state produces a control signal K. Such control signals are applied to the polarity reversing switch 83 to cause the latter to apply the D.C. voltage at D directly to the input of the integrator 84 when signal J exists or with polarity inversion when signal K exists. In other words, the signal at G (FIG. 6) is the positive or negative counterpart of the signal at D when the control signals J and K respectively are present. Since merely the polarity of the signal G supplied to the integrator 84 is changed and not its absolute magnitude (such magnitude being proportional to the D.C. voltage at D) the output signal H from the integrator will decrease (when signal K exists) from the predetermined level at the same rate as it rose to that value during the preceding period (when signal J existed). Once reset, the flip-flop 87 will remain stable in its second operating state and the polarity reversing switch 83 will continue to invert the effective polarity of the D.C. voltage it supplies to the integrator 84 until a negative spike in waveform B occurs indicating that the reference point on the rotating workpiece has passed the predetermined angular position. At this point the flip-flop is set to its first stable operating state and the polarity reversing switch no longer inverts the polarity of the D.C. voltage before applying it to the integrator. The output signal H of the integrator 83 again begins to rise at the same rate as previously until once again it reaches the predetermined level $+V_h$ (see FIG. 6).

The waveforms B and I are constrained to remain 180° out of phase by the proper selection of the predetermined level $+V_h$ detected by level detector 86. Thus, flip-flop 87 changes states and polarity reversing switch 83 changes the effective polarity of the D.C. voltage every half cycle. This in turn causes the output of integrator 84 to rise and fall to the same absolute levels because the output rises and falls at the same rate and the direction of integration is switched every half cycle. As a result, the output of the integrator 84 is a symmetrical triangular wave H as shown in FIG. 6, having a constant amplitude and being in fixed phase relation with the cyclically recurring event, i.e., with the reference pulse B.

The constant amplitude triangular waveform H is applied to a wave shaper 85 (FIG. 4) where it is converted into a corresponding constant amplitude sine wave in phase with the triangular waveform H. The diode wave shaper 85 is illustrated in more detail at 177 in FIG. 8b. It operates to generate from a triangular wave a very close approximation of a sine wave. Such triangular-to-sinusoidal shaper circuits are per se well known, and are described for example in Analog Computation, by Stanley Fifer, Vol 2; McGraw-Hill, 1961; New York, N.Y.; pps. 331–336 and 350–357.

Figure 5:
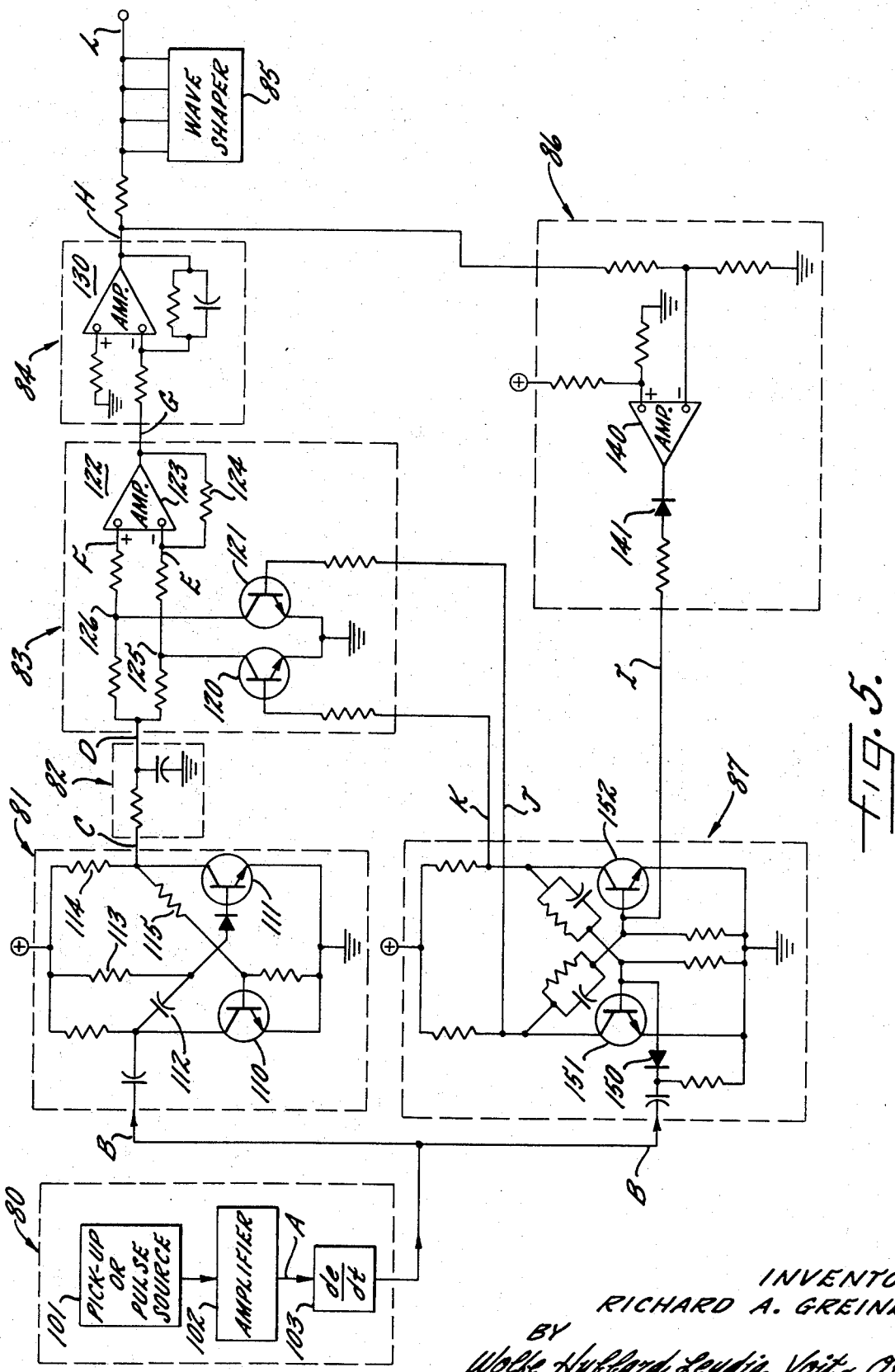
FIG. 5 is a detailed schematic circuit diagram, partially in block form, of the sine-cosine generator shown generally in FIG. 4.

With the foregoing general organization of the sine-cosine generator in mind, a more detailed description of its circuitry and operation will be presented with reference to FIGS. 5 and 6. Pulse source 80 comprises a suitable pick-up means 101 such as the photocell 69 and light source 67 shown in FIG. 3. It produces a pulse each time the reference point 72 on the workpiece passes the predetermined fixed plane 72a, and thus produces a train of pulses synchronized with a series of recurring events even though the event frequency may vary. This pick-up signal is applied to an amplifier 102 which shapes it and amplifies it to the proper level, as shown in waveform A (FIG. 6) for application to a unipolar differentiator 103. Differentiator 103 differentiates the pulse waveform to generate a waveform comprising positive and negative voltage spikes in phase with the positive going and negative going edges respectively of the pulses. Only the negative-going spikes are transmitted, as shown by waveform B in FIG. 6.

The pulses in waveform B are applied to the one-shot monostable multivibrator 81 to cause it to generate a corresponding train of pulses C in phase with the negative spikes and having a constant amplitude and a constant pulse width. During its normal operation, transistor 111 is biased through resistor 113 into its conducting state; this causes the collector of transistor 111 to remain at a voltage level just slightly above ground. When a negative spike appears at the input to the one-shot, it causes charging current to flow through a capacitor 112 and the resistor 113 to lower the voltage at the base of the transistor 111, thereby turning the latter off. This in turn causes the collector of transistor 111 to rise to a predetermined voltage level determined by the voltage divider comprising resistors 114 and 115. This voltage level will always be the same regardless of the frequency of the negative spikes because it is determined entirely by the positive voltage source and the resistors 114 and 115. There is also impressed on the base of transistor 110 a voltage sufficient to bias it into its conducting state and thus to cause its collector to drop to a voltage level slightly above ground. The one-shot will remain in this operating condition for a period determined by the time constant of the combination of capacitor 112 and resistor 113. When the charge on capacitor 112 has bled off through resistor 113 sufficiently, transistor 111 will again conduct until the next negative spike appears at the input to the one-shot. The alternate astable and stable states of the one-shot multivibrator result in the formation of positive pulses C, each pulse having a predetermined constant amplitude and pulse width and a frequency equal to the frequency of the negative spikes of waveform B and thus equal to the frequency of rotation of the rotating workpiece.

The pulse signal C is supplied to the averaging filter 82, which is a R-C filter, to obtain a substantially D.C. voltage, the magnitude of which is directly proportional to the frequency of the pulse signal. If, for instance, the frequency of pulse train C doubles because the angular velocity of the rotating workpiece is doubled, then the magnitude of D.C. voltage D is also doubled; the reverse of this situation is also true, that is, if the angular velocity of rotation decreases, the D.C. voltage D decreases proportionately.

It should be noted at this point that D.C. voltage waveform D is shown as having ripple whereas the other signals in the circuit are shown without a ripple. All the D.C. voltages do have such a ripple voltage, but for purposes of illustration they have not been shown. As is well known, such ripple introduces distortion into the signals and thus decreases the accuracy of the measurements made by the unbalance detector system. In a second embodiment of the sine-cosine generator discussed below, a novel double frequency tachometer circuit will be discussed which substantially decreases the effects of the ripple without requiring an averaging filter with an extremely large time constant and without creating the slowness or lags which such a time constant would impose.

The D.C. voltage D is next applied to polarity reversing switch 83. It is sufficient at this point to understand that polarity reversing switch 83 operates to supply the D.C. voltage to integrator 84 while inverting its effective polarity during alternate half cycles of waveform B. The magnitude of the inverted segment of the output signal G (FIG. 6) from the polarity reversing switch remains equal to the magnitude of the non-inverted segment and the time periods during which inversion and non-inversion occur in waveform G are equal. The method of accomplishing this result will be discussed in greater detail below.

Integrator 84 comprises an operational amplifier 130 with a capacitor in parallel with the resistor in its negative feedback path. Since the operation of an operational amplifier as an integrator is well known, the operation of integrator 84 will not be discussed further than to note that waveform G (which can be considered a square wave) is applied to the negative input terminal of the operational amplifier. The result of this, of course, is that the output of the operational amplifier, in addition to being the integral of the input, is inverted. The output waveform H is a triangular wave symmetrical about the zero volt level and which increases at a uniform rate during the negative half cycle of square wave G and then decreases at the same uniform rate during the positive half cycle of square wave form G. Since the time periods and the rates of decrease and increase are equal, the positive and negative amplitudes of the triangular waveform are equal. But because the rates of increase and decrease in the triangular wave H are proportional to magnitude of the D.C. voltage D, and the latter is proportional to the frequency of the reference pulses B, the frequency of the triangular waveform H is locked and made equal to the frequency of the pulses B.

Polarity reversing switch 83 operates in conjunction with and under the control of integrator 84, level detector 86 and flip-flop 87 to produce the square wave G. Assuming that the flip-flop 87 is in the "set" state and waveform G is at a negative level, the output of integrator 84 will continue to rise at a constant rate to the maximum output level obtainable from operational amplifier 130 if allowed to run freely. But, level detector 86 includes an amplifier 140 receiving and normally conrolled by a constant bias voltage supplied to its positive, non-inverting input from a voltage source and divider. The amplifier output is normally at a relatively high positive voltage relative to ground, so that a diode 141 is non-conductive and cannot draw current from the circuit of the flip-flop 87. However, when the integrator output voltage H reaches a predetermined level, such that the fraction thereof, applied from a resistance voltage divider to the negative, inverting input terminal of the amplifier 140, exceed the bias voltage, the output of the amplifier 140 switches abruptly to a large negative voltage level. The negative-going wave front (see waveform I in FIG. 6) passed by diode 141 is applied to the base of transistor 152 in the flip-flop 87. If the latter was initially in the "set" state with transistor 152 conducting, then the transistor is turned off and the flip-flop is switched to its "reset" state. Thus, immediately subsequent to the detection of the predetermined level by level detector 86, the flip-flop 87 is reset, waveform K is at a positive level, and waveform J is at substantially ground level. Under such circumstances a transistor 120 conducts causing junction 125 in the polarity reversing switch 83 to go to ground, but junction 126 is at a voltage level determined by the D.C. voltage D since transistor 121 is not conducting. Therefore, operational amplifier 123 slightly amplifies the D.C. voltage at junction 126 without inversion. Waveform G is now positive with its absolute magnitude determined by the magnitude of the signal voltage at D.

Polarity reversing switch 83 continues to make the signal G positive until a negative spike occurs in waveform B indicating that the reference point 72 on the rotating workpiece has been detected passing the predetermined angular position 72a (FIG. 3). This negative spike is applied to flip-flop 87 where it turns off transistor 151, which had been in a conducting state, thereby turning on the transistor 152 and placing the flip-flop in its "set" state to make the signals J and K respectively high and low in potential. This turns off the transistor 120 so that the signal at junction 125 is no longer shunted to ground; and it turns on transistor 121 so that the signal at junction 126 is shunted to ground. In net effect the D.C. signal at D is applied to the negative input terminal of the amplifier 123 and is reproduced with inversion as the output signal G. Therefore, the signal G is now at a negative voltage level. This causes waveform H to begin rising again until it reaches the predetermined level $+V_A$ sensed by the level detector 86, after which the described operation is repeated.

The integrator 84 thus generates a constant amplitude trangular waveform H with a frequency equal to the frequency of the negative spikes of waveform B and thus to the frequency of rotation of the rotating workpiece, --and having its negative peaks in phase with the negative spikes of waveform B and its positive peaks displaced 180° from these negative spikes. This triangular wave is then applied to wave shaper 85 which converts it into a constant amplitude sinusoidal waveform L in phase with the triangular wave in the manner discussed in the aforementioned reference text.

One of the most significant aspects of the operation of the circuit of FIG. 5 is that the output sinusoidal signal L, and necessarily the triangular waveform from which is was shaped, has a constant amplitude that remains the same regardless of changes in the angular velocity of the rotating workpiece and the frequency of the reference input signal B. Additionally, there is no need to calibrate or adjust any of the elements of the circuit to obtain this desirable result. In consequence, the accuracy of measurements of amount and angle of unbalance is enhanced, as compared to prior art devices which employ A.C. generators.

In order to determine and adjust the predetermined level $+V_h$ at which level detector 86 switches to produce the negative spikes I which reverse the operation of the integrator 84, a test run of the sine-cosine generator is performed once. Pulses B of known frequency are applied to one-shot 81 and flip-flop 87 and the D.C. voltage at D is measured. Since the output of integrator 84 is a direct measure of the area under the curve of the input signal thereto, as is any integration operation, it is only necessary to calculate the area under the D.C. voltage D during one-half of the period of B. From this figure the magnitude of the output of integrator 84 at one-half of the cycle of waveform B can be determined and this is the predetermined level which amplifier 140 should be designed to detect. Once this value has been determined, there is no need to recalibrate or adjust the circuit --assuming of course there is no change in the operating characteristics of the various elements in the circuit. This predetermined level is the same for all frequencies of waveform B. If the waveform B increases in frequency, D.C. voltage D increases proportionately, but polarity reversing switch 83 changes states at a proportionately increased rate. The result is that waveform G has a greater amplitude and a proportionately smaller period such that the area under the curve of waveform G remains constant for a half period of waveform b. The output of integrator 84 thus rises at a quicker rate so that the predetermined level is still reached at one-half the period of waveform B. The reverse is also true; that is, if the frequency of B decreases, indicating the workpiece is rotating slower, the D.C. voltage level D drops, but polarity reversing switch 83 changes states at a proportionately slower rate such that the area under waveform G during a half period of waveform B remains constant. The output of integrator 84 thus rises at a slower rate so that the predetermined level is still reached at one-half the period of waveform B.

Having observed the details of the operation of the circuit of FIGS. 4 and 5 which generates a first constant amplitude sinusoidal signal $E_1 \angle 0°$ in fixed phase relation with the input signal, attention may now be given to the circuit of FIGS. 7 and 8a and 8b which includes a modification of the circuit of FIGS. 4 and 5 and the additional circuitry required to generate the second constant amplitude sinusoidal signal $E_1 \angle 90°$. Referring to FIG. 7, pulse source 80 provides the negative pulses B (FIG. 9a) indicative of the passage of the reference point 72 on the rotating workpiece through the predetermined angular position 72a (FIG. 3). One-shot monostable multivibrator 81 responds to waveform B to generate a pulse train C in phase with the negative spikes of waveform B; and the pulses of waveform C have predetermined constant amplitudes and pulse widths, as previously described. Flip-flop 87, differentiator 160 and one-shot monostable multivibrator 161 operate together in a manner that will be described in detail below to generate a second pulse train C' which is 180° out of phase from pulse train C as shown in FIG. 9a. The pulses of pulse train C' also have predetermined constant amplitudes and pulse widths equal to those of the pulses of pulse train C. The two pulse trains C and C' are applied to an adder and averager 162 which combines the two pulse trains to effectively obtain a pulse train having twice the frequency. Adder and averager 162 then averages the combined pulse train to obtain a D.C. voltage D (FIG. 9a) that is proportional to the frequency of pulse trains C and C' and thus to the frequency of the input signal and frequency of rotation of the rotating workpiece. The circuitry to generate D.C. voltage D will be referred to as a double frequency tachometer circuit because it generates a D.C. voltage D which is proportional to the frequency of the input signal and thus to the angular velocity of the rotating workpiece by doubling the frequency of the input pulse signal and thus decreasing the ripple voltage in the D.C. level.

The D.C. voltage D is then applied to polarity reversing switch 83 which periodically changes the effective polarity of the D.C. voltage in the manner related above. In review, polarity reversing switch 83 applies the D.C. voltage to integrator 84 which integrates the D.C. voltage to obtain a voltage (waveform H in FIG. 9a) that increases at a constant rate until it reaches a predetermined level. When the outut of integrator 84 reaches the predetermined level, level detector 86 generates a negative spike, as seen in waveform I, which causes flip-flop 87 to change states. The change in operating states of flip-flop 87 causes the polarity reversing switch 83 to invert the effective polarity of D.C. voltage D. The output H of integrator 84 now begins to decrease at the same constant rate at which it had been increasing and continues to do so until a negative spike occurs in waveform B to return flip-flop 87 to its original operating state which in turn causes polarity reversing switch 83 to re-switch the effective polarity of the D.C. voltage applied to integrator 84. The predetermined voltage level $+V_h$ at which level detector 86 causes the inversion of the D.C. voltage D is determined as explained above so as to occur at one-half the period of waveform B. This results in an output H from integrator 84 which is a constant amplitude triangular waveform which is in phase with waveform B. As previously described, the triangular waveform is applied to wave shaper 85 which converts it into a constant amplitude sinusoidal signal in phase with waveform B To obtain the second sinusiodal waveform 90° displaced from the first sinusoidal waveform, triangular waveform H (FIG. 9a) is applied to a squaring amplifier 171 (FIG. 7) which converts the triangular signal into a square wave M (FIG. 9b). The cross-over points of the square wave, that is, the points at which the wave changes from its positive level to its negative level and vice versa, are in phase with the median points or zero-crossings of the triangular wave H. Square wave M is applied to pulse double 172 which generates a train of negative pulses (waveform N) in phase with the cross-over points of the square wave; as a result the frequency of waveform N is twice the frequency of waveform B and the negative spikes of waveform N are alternately displaced in phase by 90° and 270° from successive negative spikes of waveform B. The control signals J and K from flip-flop 87 are applied to a pulse doubler 170 to obtain waveform J' + K' which is another series of negative pulses 180° out of phase from the negative pulses of waveform N. The negative pulse waveforms N and J' + K' are then applied to respectively set and reset a flip-flop 173, switching of the latter causing it to produce two square wave control signals P and Q which are 180° out of phase relative to one another and each of which has a frequency equal to the frequency of the waveforms J' + K' and N (and thus twice the frequency of the pulses B).

The two control signals P and Q are applied to a polarity reversing switch 174 (similar to the switch 83 described above) causing it to produce an auxiliary signal U by reproducing the triangular waveform H during a first series of alternate 90° phase intervals of the triangular waveform (that is, during the period when waveform P is at its minimum level and waveform Q is at its maximum level) and by inverting the traingular waveform H during a second series of alternate 90° phase intervals of the triangular waveform (that is, during the period when waveform P is at its maximum level and waveform Q is at its minimum level). A more detailed discussion of the operation of a polarity reversing switch 174 will follow below, at present it is sufficient to note that auxiliary signal U is generated by polarity reversing switch 174 by inverting triangular waveform H during alternate 90° phase intervals of the triangular waveform.

Still another polarity reversing switch 175 receives a constant positive voltage at its input and receives the control signals K and J from flip-flop 87 to generate a square wave X in phase with the waveform B and thus in phase with auxiliary waveform U. Auxiliary waveform U and square waveform X are then added together in adder 176 to produce a second constant amplitude triangular waveform Y which is 90° displaced from triangular waveform H. Triangular waveform Y is next applied to a wave shaper 177 to be converted into the desired second constant amplitude sinusoidal waveform Z displaced 90° from sinusoidal waveform L.

With the foregoing general organization of the complete sine-cosine generator in mind, a more detailed description of its circuitry and operation will be presented with particular reference being made to FIGS. 8a–b and 9a–c. The creation of the first constant amplitude sinusoidal waveform $E_1 \angle 0°$ in phase with the input signal (i.e., the pulses A or their counterparts B) has been described in detail above. Therefore, except for a discussion of the novel circuitry used to generate the D.C. voltage D with a reduced amount of ripple voltage, illustrated in FIG. 8a, the circuitry for generating the first sinusoidal signal will not be further discussed.

In the double frequency tachometer employed to produce the D.C. voltage D, the negative pulses B are applied to one-shot multivibrator 81 (FIG. 8a) which responds by generating a constant amplitude and constant pulse width pulse signal C in phase with waveform B. The control signal J from flip-flop 87 is applied to differentiator 160 which produces a series of alternate positive and negative voltage spikes in phase with the positive going and negative going edges of waveform J respectively. Waveform J' illustrates only the negative spikes of the differentiator's output signal, which are 180° phase displaced from the negative spikes of waveform B, since the positive spikes do not affect the operation of one-shot 161 because diode 200 blocks the passage of the positive spikes applied to its cathode or negative terminal. Normally, the transistor 204 of one-shot 161 conducts so that voltage in waveform C' is just slightly above ground; however, when a negative spike of waveform J' is impressed on the base of transistor 204 it is turned off. During this time period, which is determined by the time constant of capacitor 201 and resistor 202, the waveform C' rises and remains at its positive level. Thereafter (as described above with reference to the one-shot multivibrator 81) the transistor 203 turns off and the transistor 204 is turned on, ending the pulse C'. Because the one-shot devices 81 and 161 are identically constructed, the pulses in waveforms C and C' are of identical amplitude and width, but they are displaced 180° from each other. These pulses C and C' are applied to adder and averager 162 which combines them at a junction 190 forming the input to a filter 191. The output of the filter is amplified by an operational amplifier 192, to obtain a D.C. voltage (here labeled signal D) which is proportional to their frequencies.

This manner of generating a D.C. voltage indicative of the angular velocity of the rotating workpiece is advantageous for several reasons. First, because of the increased number of pulses for a given period of time the ripple in the D.C. voltage is decreased. This results from the fact that the capacitor in filter 191 has less time in which to discharge before another pulse is applied to it; since there is less time for the capacitor to discharge, it discharges a decreased amount and thus the amplitude of the undesired ripple is significantly less. Second, the ripple component which does exist in the D.C. voltage D and in the subsequent signals is symmetrical about both points in phase with end points 180° displaced from the input signal (i.e., pulses A or B) which occur at those instants in time at which the polarity reversing switch 83 changes the effective polarity of the D.C. voltage D applied to integrator 84 and re-switches the polarity to its original positive level. This means that to the extent that the D.C. voltage D varies with ripple during intervals in which the integrator is integrating "positively" (i.e., waveform H has a positive slope), the very same variations due to ripple occur during intervals in which the integrator is integrating "negatively" (i.e., waveform H has a negative slope). Thus, any minor distortion in the waveform H is symmetrical, i.e., appears identically in the positive and negative slope portions, and thus tends to cancel. Third, because the combined pulse train C and C' has a doubled frequency, the filter required to average and to obtain the D.C. voltage D can have a smaller time constant for the same amplitude of accepted ripple, and thus lags in the response of the system are reduced.

In order to generate the second sinusoidal waveform $E_1 \angle 90°$ (shown at Z in FIG. 9c), triangular waveform H is applied to squaring amplifier 171 which comprises essentially a high-gain amplifier 210 that saturates with a small positive input voltage to produce a constant voltage output regardless of the magnitude of the positive voltage input. In essence, triangular waveform H "triggers" amplifier 210 (FIG. 8b) at its positive going zero-crossings (which are 90° displaced from waveform B) into negative output saturation, and switches the amplifier 210 into positive output saturation at the negative going zero-crossings to generate a square wave M disxlaced by a 90° phase angle from waveform B.

Square wave M is applied to pulse doubler 172 where it is differentiated by capacitor 220 to generate positive and negative spikes; the positive spikes are shunted to ground by diode 221 and the negative spikes are transmitted to a junction 227 through a diode 222. Square wave M during its positive half cycles also causes transistor 223 to conduct; the transistor produces an inverted square wave at its collector which is differentiated by capacitor 224 to generate a second series of positive and negative spikes 180° out of phase from those produced by capacitor 220. A diode 226 shunts the second series of positive spikes to ground and a diode 225 transmits the negative spikes to junction 227 where they combine with the first series of negative spikes to form waveform N (see FIG. 9b).

A second negative spike waveform J' + K', which is 180° displaced from waveform N, is generated in the pulse doubler 170. This is accomplished by applying waveforms K and J, which are 180° displaced from each other, through differentiating capacitors 240 and 241 to form two series of positive and negative spikes; the negative spikes in each series are passed by diodes 242 and 243 and are combined at junction 245 to form waveform J' + K'. Waveforms N and (J' + K') are then each applied respectively to the set and reset inputs of the flip-flop 173 which operates in a known manner to alternately cause transistors 230 and 231 to conduct to generate the control signals P and Q.

Triangular waveform H is supplied as the input to the polarity reversing switch 174 which, in effect, inverts alternate quarter cycles of it to produce the auxiliary signal U in the following manner. When waveform P is high, transistor 250 conducts; therefore, junction 252 is at approximately ground potential. But waveform Q is at this time low, transistor 251 is cut off, and junction 253 is at a potential determined by waveform H. Therefore, operational amplifier 254 inverts the signal at junction 253. During the next 90° phase interval, waveform Q is high and transistor 251 conducts; therefore, junction 253 is at approximately ground potential. But waveform P is at this time low, transistor 250 is cut off, and junction 252 is at a voltage level determined by triangular waveform H. Therefore, operational amplifier 254 merely reproduces the signal at junction 252.

In effect, the output signal U from amplifier 254 appears as if the input voltages at junctions 253 and 252 (applied to the + and − inputs of the amplifier) had the discontinuous waveforms shown at R and S in FIG. 9b. During the first quarter cycle of the waveform H, it is as if the waveform H were applied directly to the amplifier due to the presence of signal S. During the second quarter cycle, however, the positive and positive-going portion of waveform H constitutes the waveform R applied to the − input of amplifier 254, so that the output voltage U is inverted and appears as negative and negative-going (see FIG. 9c). During the third quarter cycle, the signal H forms the input signal S applied to the + input terminal, so both the signal H and the output signal U are positive in polarity but decreasing. During the last quarter cycle, the signal H forms the input signal R, so the signal U is positive and positive-going when the signal H is negative and negative-going. In effect, the signal S is directly added to the inverted signal R, so that the output signal U has a recurring "M-shaped" waveform with a frequency equal to that of waveform H.

Auxiliary waveform U is then applied to adder 176 where it is combined with the square wave X generated by polarity reversing switch 175. Waveforms K and J control the operation of polarity reversing switch 175 by alternately causing transistors 260 and 261 to conduct and thus alternately causing junctions 262 and 263 to go to approximately ground potential. Operational amplifier 264 then either inverts or directly reproduces the constant D.C. voltage input, so the signal X has the form shown in FIG. 9c. Auxiliary waveform U and square wave form X are combined through summing resistors at input junction 270 of adder 176, which comprises merely a conventional operational amplifier. Because the input is to the negative input terminal, operational amplifier 271 inverts the combined signal to generate the constant amplitude triangular waveform Y which is 90° displaced from triangular waveform H.

Wave shaper 177 converts triangular waveform Y into a constant amplitude sinusoidal waveform 90° out of phase from sinusoidal waveform L. The sinusoidal waveform is then amplified in amplifier 178 to produce the desired constant amplitude sinusoidal waveform Z which is 90° displaced from sinusoidal waveform L. The output signals L and Z thus constitute the sinusoidal signals $E_1 \underline{/0°}$ and $E_1 \underline{/90°}$ which are utilized in FIG. 2, as described, to derive the voltages displayed on the meters 63 and 62 as representing the amount and location of the workpiece unbalance.

From the foregoing, it may be seen that the invention brings advantageous improvements to the art of unbalance measuring systems through the employment of novel circuits which per se may also be susceptible of use to good advantage in other applications. First, a non-contacting, zero-inertia, non-vibrating, small lag sinusoidal signal generator is here provided (as shown in FIGS. 4 and 5) to produce a substantially pure sine wave voltage $E_1 \underline{/0°}$ which is fixed in phase with the rotation of the workpiece 20 — even though the speed of rotation and thus the frequency may vary widely — and yet without any speed-responsive changes in the amplitude of that voltage. Second, a companion signal in phase quadrature to the first is produced with the same constant phase and amplitude characteristics, as described with reference to FIGS. 7 and 8 where the final output waveform Z constitutes the voltage $E_1 \underline{/90°}$. Third, the double frequency arrangement of FIG. 8 for producing the D.C. voltage D greatly lessens the undesirable effects of ripple without requiring a filter with an inordinnately large time constant. Because the sine and consine waves produced by the sin-cos generator 71 shown in FIGS. 8a-b are substantially free of distortion, amplitude variations, or spurious phase jitter, are created without adding to the inertia or false vibration to the rotationally driven workpiece, the unbalance measuring system of FIGS. 2 and 3 yields extremely accurate readings of both magnitude and location of unbalance, which require no extra and expensive apparatus to assure that the driving speed does not vary.

I claim:

1. In an apparatus for producing a triangular waveform signal 90° out of phase from a reference triangular wave, the combination comprising first means to produce an auxiliary signal by producing the reference triangular wave during a first series of alternate 90° phase intervals of the reference wave and by inverting the reference triangular wave during a second series of alternate 90° phase intervals of the reference wave;

means to generate a first square wave in phase with the reference triangular wave; and means to add the auxiliary signal and the first square wave; whereby the sum of the auxiliary signal and the first square wave is a second triangular waveform signal 90° out of phase from the reference triangular wave and having a frequency equal to the frequency of the reference triangular wave and a peak to peak amplitude equal to that of the reference triangular wave.

2. In a sine-cosine generator, the combination comprising means to generate a periodic pulse train whose frequency may vary;

means to generate in response to the periodic pulse train a D.C. voltage having a magnitude which varies directly with the frequency of the periodic pulse train;

integrating means having an input and an output to produce a first output signal;

connecting means for supplying the D.C. voltage to said input;

control means responsive to said first output signal and to the periodic pulse train to cause said connecting means to change the effective polarity with which the D.C. voltage is applied to said input at each instant that said first output signal reaches a predetermined level and at each instant one of the pulses in the periodic pulse train appears;

means to produce an auxiliary signal by reproducing said first output signal during a first series of alternate 90° phase intervals of the first output signal and by inverting the first output signal during a second series of alternate 90° phase intervals of the first output signal;

means to generate a first square wave in phase with said first output signal; and means to add the auxiliary signal and the first square wave to produce a second output signal;

whereby the first output signal is a first triangular wave with its frequency equal to the frequency of the periodic pulse train and having a constant amplitude and a fixed phase relationship with the periodic pulse train, and the second output signal is a second triangular wave with its frequency equal to the frequency of the periodic pulse train and having a constant amplitude and being 90° out of phase from the first triangular wave.

3. The combination set forth in claim 2 further comprising first wave forming means to convert the first output signal into a first constant amplitude sinusoidal waveform in phase with the first output signal; and second wave forming means to convert the second output signal into a second constant amplitude sinusoidal waveform in phase with the second output signal;

whereby the first constant amplitude sinusoidal waveform and the second constant amplitude sinusoidal waveform have frequencies equal to the frequency of the periodic pulse train and are 90° out of phase with respect to each other.

4. In an apparatus for producing a periodic, constant amplitude triangular waveform signal in fixed phase relationship to a cyclically recurring event which may vary in frequency, the combination comprising, first means to detect the cyclically recurring event and to produce a train of pulses, each pulse corresponding to an event occurrence;

second means connected to receive the train of pulses and to produce a dc. voltage which in magnitude is indicative of the frequency of such pulses, said second means including a. means to generate a first pulse signal with a predetermined pulse width and a predetermined amplitude and having its frequency equal to that of said pulse train, b. means to generate a second pulse signal with said predetermined pulse width and amplitude but shifted substantially 180° out of phase from the first pulse signal, c. means to combine said first and second pulse signals to produce a third pulse signal having twice the frequency of said first and second pulse signals, and d. means to average the third pulse signal to generate the dc. voltage, whereby ripple is substantially decreased in the dc. voltage and any that does exist in symmetrical about a point 180° displaced from each pulse in said train of pulses, integrating means having an input and an output;

connecting means for supplying the dc. voltage to said input; and control means responsive to the output signal at said output of said integrating means and to the train of pulses to cause said connecting means to change the effective polarity with which the dc. voltage is applied to said input of said integrating means at each instant that the first output signal reaches a predetermined level and at each instant one of the pulses in the pulse train appears; whereby the output signal is of triangular waveform having a frequency equal to the frequency of occurrence of the recurring event, a fixed phase relationship with the recurring event, and a constant amplitude independent of the frequency of occurrence of the recurring event.

5. The method of generating a constant amplitude, triangular wave in phase with a periodic reference signal which may vary in frequency, comprising providing a periodic reference signal;

generating in response to the periodic reference signal a dc. voltage which varies directly with the frequency of the reference signal, by a. generating a first train of pulses having a predetermined pulse width with a predetermined amplitude and in fixed phase relationship with the reference signal, b. generating a second train of pulses having said predetermined pulse width with said predetermined amplitude and substantially 180° out of phase from the first train of pulses, c. combining the first and second trains of pulses to produce a third train of pulses having twice the frequency of either the first or second train; and d. averaging the third train of pulses to generate the D.C. votlage that varies directly with the frequency of the reference signal, integrating the D.C. voltage; and reversing the effective polarity of the D.C. voltage while it is being integrated each time the resultant of the integrating operation reaches a predetermined level or the periodic reference signal appears; whereby the resultant is a constant amplitude triangular wave having a fixed phase relationship with the periodic reference signal and the same frequency as the periodic reference signal.

6. In an apparatus for producing a triangular waveform signal 90° out of phase from a reference triangular wave, the combination comprising first pulse generator means to produce a first pulse train in phase with the reference triangular wave and a second pulse train 180° out of phase from the reference triangular wave;

means to combine the first and second pulse trains to produce a third pulse train;

a second pulse generator means to produce a fourth pulse train 180° out of phase from the third pulse train;

a first bistate device switchable to a first state by the fourth pulse train to produce a first control signal and to a second state by the third pulse train to produce a second control signal;

switching means connected to receive the reference triangular wave at its input;

said switching means being responsive to the first and second control signals to produce at its output an auxiliary signal which is (a) the reference triangular wave during the first series of alternate 90° phase intervals of the reference wave and (b) the inversion of the reference triangular wave during the second series of alternate 90° phase intervals of the reference wave, means to generate a first square wave in phase with the reference triangular wave; and means to add the auxiliary signal and the first square wave; whereby the sum of the auxiliary signal and the first square wave is a second triangular waveform signal 90° out of phase from the reference triangular wave and a peak to peak amplitude equal to that of the reference triangular wave.

7. The combination set forth in claim 6 wherein said second pulse generator means comprises third means to convert the reference triangular wave into a second squarewave having its crossover points in phase with the crossover points of the reference triangular wave; and pulse doubler means responsive to the second squarewave for producing the fourth pulse signal.

8. In apparatus for producing a periodic, constant amplitude triangular waveform signal in fixed phase relationship to a cyclically recurring event which may vary in frequency, the combination comprising first means to produce a train of pulses with each pulse therein substantially in time coincidence with one of said event occurrences;

second means connected to receive said train of pulses and to produce a D.C. voltage, the magnitude of which is indicative of the frequency of said pulse train;

means including an integrating operational amplifier having inverting (−) and non-inverting (+) input terminals, together with an output terminal; and control means responsive to the output signal at said output terminal and to said train of pulses for (a) switching said D.C. voltage to one of said input terminals in response to said output signal reaching a predetermined magnitude, and (b) switching said D.C. voltage to the other of said input terminals in response to the appearance of a pulse in said pulse train;

whereby said output signal is of triangular waveform having a frequency equal to the frequency of the recurring event, a fixed phase relationship to the recurring event, and a constant amplitude independent of the frequency of the recurring event.

* * * * *